United States Patent
Zhang et al.

(10) Patent No.: US 12,347,431 B2
(45) Date of Patent: Jul. 1, 2025

(54) UPDATING CONSTRAINTS FOR COMPUTERIZED ASSISTANT ACTIONS

(71) Applicant: Microsoft Technology Licensing, LLC, Redmond, WA (US)

(72) Inventors: Yuchen Zhang, Fremont, CA (US); Jason Andrew Wolfe, Berkeley, CA (US); Adam David Pauls, San Francisco, CA (US); David Leo Wright Hall, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 17/906,322

(22) PCT Filed: Mar. 19, 2021

(86) PCT No.: PCT/US2021/023116
§ 371 (c)(1),
(2) Date: Sep. 14, 2022

(87) PCT Pub. No.: WO2021/202124
PCT Pub. Date: Oct. 7, 2021

(65) Prior Publication Data
US 2023/0102386 A1   Mar. 30, 2023

(30) Foreign Application Priority Data

Mar. 30, 2020   (NL) ..................................... 2025235

(51) Int. Cl.
*G10L 15/22*   (2006.01)
*G06Q 10/1093*   (2023.01)

(52) U.S. Cl.
CPC .......... *G10L 15/22* (2013.01); *G06Q 10/1095* (2013.01); *G10L 2015/223* (2013.01)

(58) Field of Classification Search
CPC ....... G10L 15/22; G10L 15/06; G10L 15/063; G10L 15/065; G10L 15/08; G10L 15/083;
(Continued)

(56) References Cited

U.S. PATENT DOCUMENTS

2018/0114522 A1*   4/2018   Hall .................... G10L 13/02
2018/0308481 A1   10/2018   Cohen et al.
(Continued)

OTHER PUBLICATIONS

"Search Report and Written Opinion Issued in Netherlands Patent Application No. N2025235", Mailed Date: Jan. 20, 2021, 9 Pages.
(Continued)

*Primary Examiner* — Qi Han
(74) *Attorney, Agent, or Firm* — Alleman Hall & Tuttle LLP

(57) ABSTRACT

A method of adapting a computerized assistant program to satisfy an updated constraint. The method comprises maintaining a dialogue history including a first utterance that indicates an initial constraint. The method further comprises receiving a second utterance indicating a new constraint that conflicts with the initial constraint. The method further comprises recognizing a revision function statement parametrized by a reference to an initial computerized assistant program configured to satisfy the initial constraint, and a reference to the new constraint. The method further comprises executing instructions derived from the revision function statement to return a revised computerized assistant program that is configured to satisfy the new constraint.

20 Claims, 9 Drawing Sheets

(58) Field of Classification Search
CPC ... G10L 15/18; G10L 15/1822; G10L 15/183; G10L 15/20; G10L 15/26; G10L 2015/0631–0638; G10L 2015/221–228
USPC ............ 704/257, 231, 235, 270.1, 275, 277
See application file for complete search history.

(56) References Cited

U.S. PATENT DOCUMENTS

| | | |
|---|---|---|
| 2019/0103107 A1 | 4/2019 | Cohen et al. |
| 2021/0209169 A1* | 7/2021 | Sundararajan ............ G06F 8/30 |

OTHER PUBLICATIONS

"International Search Report and Written Opinion issued in PCT Application No. PCT/US21/023116", Mailed Date: Jun. 4, 2021, 12 Pages.

First Examination Report Received for Indian Application No. 202247052414, mailed on May 16, 2025, 07 pages.

* cited by examiner

FIG. 3A

DIALOGUE HISTORY 300A

FIRST USER UTTERANCE 302A

"Create a meeting from 10AM to 10:30AM tomorrow."

INITIAL COMPUTERIZED ASSISTANT PROGRAM 304A

```
[x0] = tomorrow()
[x1] = createEvent(Constraint[Event]{
    start: ==(DateTime{date: [x0], time: Time(10:00)}),
    end: ==(DateTime{date: [x1], time: Time(10:30)})
})
```

SECOND USER UTTERANCE 306A

"Extend it to 60 minutes."

REVISION FUNCTION STATEMENT 308A

```
revise([x1], Constraint[Event]{duration: ==(60.toMinutes())})
```

REVISED COMPUTERIZED ASSISTANT PROGRAM 310A

```
createEvent(Constraint[Event]{
    start: ==(DateTime{date: tomorrow(), time: Time(10:00)}),
    duration: ==(60.toMinutes())
})
```

FIG. 3B

DIALOGUE HISTORY 300B

FIRST USER UTTERANCE 302B

"What's on my schedule tomorrow?"

INITIAL COMPUTERIZED ASSISTANT PROGRAM 304B

```
[x0] = tomorrow()
[x1] = findEvent(Constraint[Event]{
    start: >=(DateTime{date: [x0], time: Time(00:00)})},
    end: <=(DateTime{date: [x0], time: Time(23:59)})
})
```

SECOND USER UTTERANCE 306B

"That's too overwhelming, show me afternoon events only...."

REVISION FUNCTION STATEMENT 308B

```
revise([x1], Constraint[Event]{
    start: Constraint[DateTime]{time: >(Time(12:00))},
    end: Constraint[DateTime]{time: <=(Time(17:00))}
})
```

REVISED COMPUTERIZED ASSISTANT PROGRAM 310B

```
findEvent(Constraint[Event]{
    start: >(DateTime{date: [x0], time: Time(12:00)})},
    end: <=(DateTime{date: [x0], time: Time(17:00)})
})
```

FIG. 3C

DIALOGUE HISTORY 300C

FIRST USER UTTERANCE 302C

"What's on my schedule today after 12PM"

INITIAL COMPUTERIZED ASSISTANT PROGRAM 304C

```
[x] = findEvent(Constraint[Event]{
    start: Constraint[DateTime]{
        date: ==(today()),
        time: >=(Time(12:00))
    }
})
```

SECOND USER UTTERANCE 306C

"I'm not hearing what I expected, what about after 10AM?"

REVISION FUNCTION STATEMENT 308C

```
revise([x], Constraint[Event]{
    start: Constraint[DateTime]{time: >= (Time(10:00))},
})
```

REVISED COMPUTERIZED ASSISTANT PROGRAM 310C

```
findEvent(Constraint[Event]{
    start: Constraint[DateTime]{
        date: ==(today()),
        time: >= (Time(10:00))
    }
})
```

FIG. 3D

DIALOGUE HISTORY 300D

FIRST USER UTTERANCE 302D

"Create a meeting... Invite David A. and Adam C."

INITIAL COMPUTERIZED ASSISTANT PROGRAM 304D

```
[x] = createEvent(Constraint[Event]{
  attendees: and(
    exists(Constraint[Person]{name: ==(" David A.")}),
    exists(Constraint[Person]{name: ==("Adam C.")})
  )
})
```

SECOND USER UTTERANCE 306D

"Sorry, I meant David B., not David A."

REVISION FUNCTION STATEMENT 308D

```
RevisionModel([x], Constraint[Event]{
    attendees: and(
        exists(Constraint[Person]{name: ==("David B.")}),
        not(exists(Constraint[Person]{name: ==("David A.")}))
    )
})
```

REVISED COMPUTERIZED ASSISTANT PROGRAM 310D
```
createEvent(Constraint[Event]{
    attendees: and(
        exists(Constraint[Person]{name: ==("Adam C.")}),
        exists(Constraint[Person]{name: ==("David B.")}),
        not(exists(Constraint[Person]{name: ==("David A.")}))
    )
})
```

FIG. 3E

DIALOGUE HISTORY 300E

FIRST USER UTTERANCE 302E
"Search for a flight, next Wednesday from Boston to Seattle.
I need to arrive by 5PM."

INITIAL COMPUTERIZED ASSISTANT PROGRAM 304E
```
[x] = searchFlight(Constraint[Flight]{
    from: ==("Boston")
    to: ==("Seattle")
    arrival: Constraint[DateTime]{
        date: ==(nextDayOfWeek(Wednesday)),
        time: <=(Time(17:00))
    }
})
```

ASSISTANT UTTERANCE 305E
"I can't find any matching flight."

SECOND USER UTTERANCE 306E

"OK... What about next Tuesday?"

REVISION FUNCTION STATEMENT 308E

```
revise([x], Constraint[Flight]{
    arrival: Constraint[DateTime]{date:
==(nextDayOfWeek(Tuesday))}
})
```

REVISED COMPUTERIZED ASSISTANT PROGRAM 310E

```
searchFlight(Constraint[Flight]{
    from: ==("Boston")
    to: ==("Seattle")
    arrival: Constraint[DateTime]{date:
==(nextDayOfWeek(Tuesday))}
})
```

UPDATING CONSTRAINTS FOR COMPUTERIZED ASSISTANT ACTIONS

CROSS REFERENCE TO RELATED APPLICATIONS

The present application is a U.S. National Phase of International Patent Application Serial No. PCT/US2021/023116 entitled "UPDATING CONSTRAINTS FOR COMPUTERIZED ASSISTANT ACTIONS", filed Mar. 19, 2021 which claims priority to Netherlands Patent Application Serial No. 2025235, filed Mar. 30, 2020.

BACKGROUND

A computerized assistant may be programmed to respond to user utterances with suitable actions. For example, responsive to a user telling the computerized assistant to schedule a meeting, the computerized assistant may add a meeting to the user's calendar. State of the art computerized assistants employ one or more machine learning models to provide this assistive functionality. Training these machine learning models may require large quantities of annotated training data. Annotating the training data can be extremely time consuming and technically challenging for human annotators.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of adapting a computerized assistant program to satisfy an updated constraint comprises maintaining a dialogue history including a first utterance that indicates an initial constraint. The method further comprises receiving a second utterance indicating a new constraint that conflicts with the initial constraint. The method further comprises recognizing a revision function statement parametrized by a reference to an initial computerized assistant program configured to satisfy the initial constraint, and a reference to the new constraint. The method further comprises executing instructions derived from the revision function statement to return a revised computerized assistant program that is configured to satisfy the new constraint.

Accordingly there is provided a method, a computer program, a computer system, and a computerized assistant system as detailed in the claims that follow.

BRIEF DESCRIPTION OF THE DRAWINGS

FIGS. 3A-3F show exemplary dialogue histories, each exemplary dialogue history including an initial computerized assistant program and a revised computerized assistant program based on a new constraint.

DETAILED DESCRIPTION

Humans may interact with computerized assistant systems via natural language. When humans interact via natural language, they may express an initial request including one or more constraints to be satisfied (e.g., desired and/or required behaviors by a computerized assistant). Humans may express a modification to the initial request by changing previous constraints and/or adding new constraints. For example, users may make follow-up requests such as "change the meeting to the afternoon," "show me only the one-on-one meetings," or, "please schedule with at least 2 hours between the two flights." The present disclosure is directed to techniques for training a computerized assistant to process an additional constraint efficiently by predicting a suitable revision function statement specifying the additional constraint, and processing the revision function statement with a dedicated revision model.

Figure 1:
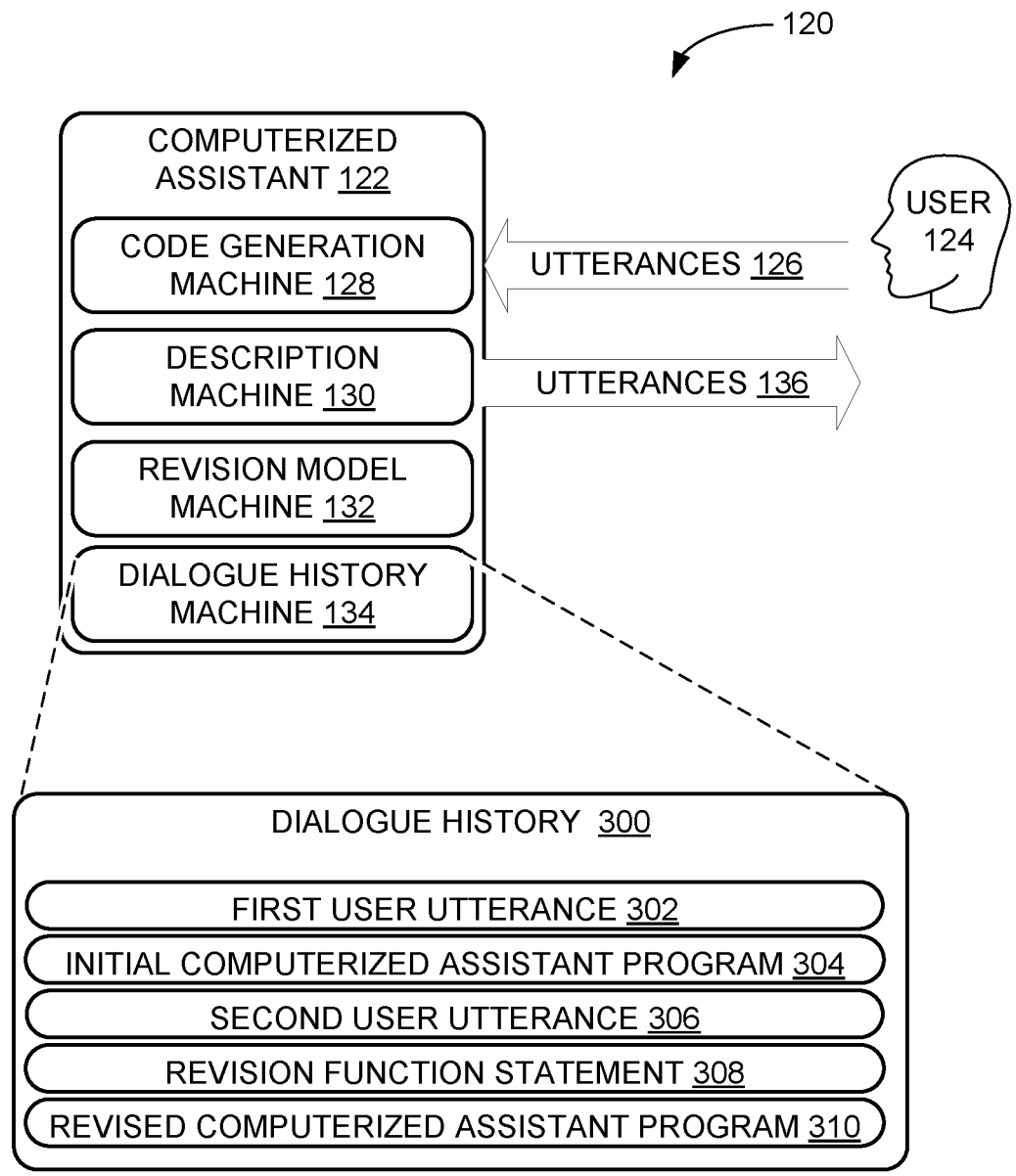
FIG. 1 shows a computing architecture for a computerized assistant.

FIG. 1 shows an exemplary computing architecture 120 for a computerized assistant 122. Computerized assistant 122 is configured to receive one or more user utterances 126 from a user 124 (e.g., via a microphone, keyboard, touch screen, and/or any other suitable input device). Computerized assistant 122 is configured to generate and/or execute instructions to perform actions to assist user 124 based on the user utterances 126. For example, computerized assistant 122 may include a code generation machine 128 configured to translate the user utterances 126 into an initial computerized assistant program comprising one or more instructions in a computer-readable programming language executable by the computerized assistant. The initial computerized assistant program may be configured to satisfy an initial constraint indicated by the user utterances 126. In some examples, code generation machine 128 may include a previously-trained machine-learning model configured to generate the initial computerized assistant program. For example, the previously-trained machine-learning model may be trained to generate programs based on one or more labeled data tuples. As an example, a labeled data tuple may include an exemplary utterance and an exemplary computerized assistant program received from a human annotator. Computerized assistant 122 may further include a dialogue history machine 134 configured to maintain a dialogue history 300. In examples, dialogue history 300 may include a plurality of user utterances and/or computerized assistant programs configured for responding to the user utterances. As a non-limiting example, dialogue history 300 includes a first user utterance 302 and an initial computerized assistant program 304 configured for responding to the first user utterance 302. For example, the first user utterance 302 may indicate a constraint and the initial computerized assistant program 304 may be configured to satisfy that constraint. Continuing the non-limiting example, dialogue history 300 may further include a second user utterance 306 indicating a new constraint. Dialogue history 300 may further include a revision function statement 308 indicating a revision to the initial computerized assistant program 304. For example, the revision function statement 308 may indicate how to revise the initial computerized assistant program 304 so as to generate a revised computerized assistant program 310 that would satisfy the new constraint indicated in the second user utterance.

The use of revision function statements may reduce costs associated with training a machine learning system. For example, training code generation machine 128 to generate suitable programs may require a large quantity of training data in the form of exemplary dialogues indicating exemplary user utterances and exemplary computerized assistant programs for responding to those user utterances. For example, code generation machine 128 may be trained on tens, hundreds, or thousands of exemplary dialogues. In general, a human annotator may be required to look at a plurality of exemplary user utterances, and for each exemplary utterance, to author a suitable computerized assistant program.

In accordance with the present techniques, a human annotator may provide a simple revision function statement as an exemplary computerized assistant program for responding to a user utterance, instead of explicitly specifying implementation details of a computerized assistant program. Accordingly, code generation machine 128 may be trained to generate suitable revision function statements when responding to user utterances. For example, the human annotator may be able to use a revision function statement that simply refers to a suitable program from earlier in an exemplary dialogue, along with new constraints from the user utterance. By utilizing a simple, and unchanging revision function statement format, the human annotator may be able to respond to a plurality of different exemplary user utterances with the same simple revision function statement parameterized with an initial program to revise, and a new constraint for the revision. The human annotator may be able to quickly/easily provide an annotation for responding to a new constraint in a user utterance, without having to provide full details of a computer program for responding to the new constraint. Instead, the revision function statement may be provided by the human annotator in the simple, unchanging format. Accordingly, the use of the revision function statement may substantially reduce a cost associated with training a machine learning system (e.g., by reducing costs associated with teaching human annotators how to author training data and/or costs associated with compensating human annotators for providing annotations).

Figure 2:
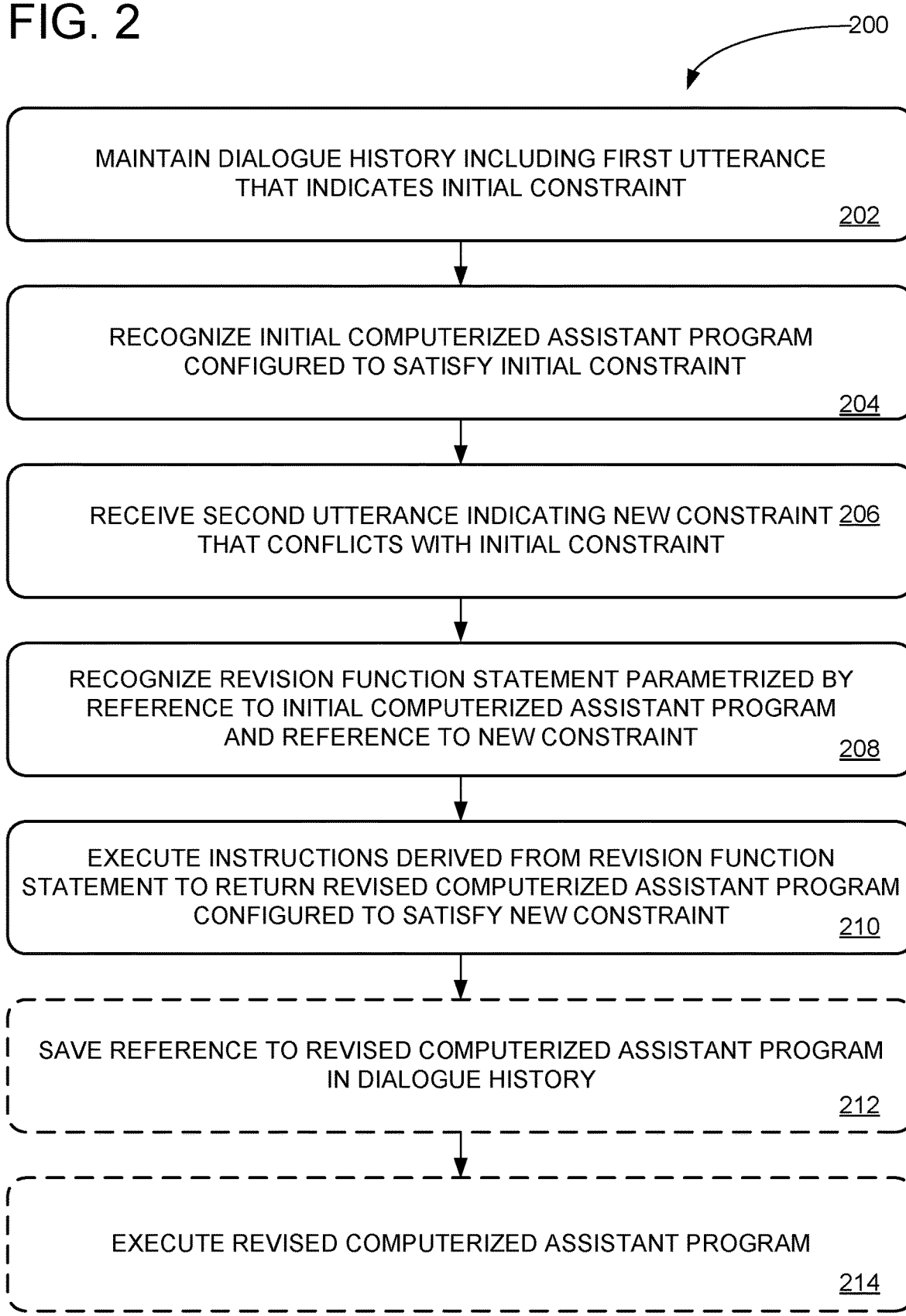
FIG. 2 shows a method of updating a computerized assistant action based on a new constraint.

FIG. 2 shows a method 200 of adapting a computerized assistant program to satisfy an updated constraint. At 202, method 200 includes maintaining a dialogue history of an interaction between a computerized assistant and one or more users, for example dialogue history 300 of FIG. 1. The dialogue history may be instantiated as any suitable computer-readable data structure for storing data related to any interaction between the computerized assistant and the one or more users (e.g., utterances, actions, and/or contextual information). As used herein, utterances include any communication between a user and a computerized assistant, e.g., audible speech by the user, text input by the user, keyboard commands by the user, audible speech by the computerized assistant, and/or visual presentation of human-readable text by the computerized assistant. An utterance stored in the dialogue history may specify one or more constraints. Constraints may include any contextual information that indicates a desired/required behavior by the computerized assistant, for example, constraints on what action(s) should be taken by the computerized assistant, and/or when the action(s) should be taken.

Utterances may include any communication between a user and a computerized assistant, e.g., via any suitable communication mode. In some examples, utterances are verbal speech communication. In some examples, utterances may include other communication modes, such as non-verbal communication and/or input provided by a user via a computer device. For example, as used herein, utterance may refer to sign language, non-verbal gestures (e.g., waving, nodding head, changes in posture), button presses, keyboard input (e.g., utterances input via a text chat interface), and/or mobile device touch-screen input. For example, a computerized assistant may be configured to recognize one or more gestures tied to specific user requests (e.g., a user gesture to turn on a multimedia device by clapping hands). Alternately or additionally, the computerized assistant may be configured to generally recognize a user context indicated by a gesture or computer input. For example, if a user nods their head or provides keyboard input while the computerized assistant asks a confirmation question such as, "should I purchase the airline ticket for tomorrow?" the computerized assistant may be configured to recognize the user gesture/input indicating an affirmative answer to the question. As another example, if a user shrugs when reconciling details about a planned meeting, the computerized assistant may be configured to recognize the user is ambivalent and automatically select details without further user intervention. Accordingly, users may interact with the computerized assistant (e.g., to specify and/or modify constraints) through any combination of communication modes. Although examples herein are described with regard to utterances in the form of user speech, the techniques disclosed herein are suitable for handling new user constraints provided via any suitable interaction between user and computerized assistant.

As an example, FIG. 3A shows a dialogue history 300A including first user utterance 302A in which a user asks for the computerized assistant to "create a meeting from 10 AM to 10:30 AM tomorrow." The user utterance pertains to creating a meeting, with constraints including a start time of 10 AM, a finish time of 10:30 AM, and a date of tomorrow's date.

Returning to FIG. 2, at 204, method 200 further includes recognizing an initial computerized assistant program configured to satisfy the initial constraint. For example, as shown in FIG. 3A, based on receiving the first user utterance 302A, the computerized assistant may automatically generate an initial computerized assistant program 304A configured to perform an action in response to the first user utterance (e.g., the action is configured to satisfy constraints in the first user utterance).

As a non-limiting example, initial computerized assistant program 304A is shown in an exemplary programming language specific to the computerized assistant. For example, FIG. 3A shows an initial computerized assistant program 304A in a data-flow programming language based on data-flow functions (e.g., shown using a parenthesized function call syntax in the example). Alternately or additionally, the approaches described herein may be adapted to any other suitable programming language (e.g., source code, byte-code, assembly code, functional, imperative, object-oriented, and/or any other programming language).

The initial computerized assistant program 304A is configured to save a variable "x0" (shown in square brackets) indicating tomorrow's date, and to save another variable "x1" indicating an executable function configured to create a new calendar event with a determined set of constraints. With reference to FIG. 1, code generation machine 128 of computerized assistant 122 is configured to generate the initial computerized assistant program. For example, code generation machine 128 may include a machine-learning model trained via supervised training on labelled data. As a non-limiting example, the labelled data may include exemplary utterances and exemplary programs configured for responding to the utterances. Accordingly, based on the training, code generation machine 128 may be configured to respond to a given utterance with a suitable program configured to respond to the utterance. For example, the utterance may indicate a constraint and code generation machine 128 may be configured to generate a program that is configured to satisfy the constraint. Although not shown in FIG. 3A, executing the computerized assistant program 304A may cause the computerized assistant to emit output to communicate with the user (e.g., text and/or speech output). For example, the computerized assistant may be configured to output a description of any program that is run and/or results of the program being run, based on the functions invoked by the program. As a non-limiting example, the computerized assistant may be configured to describe the initial computerized assistant program 304A based on the invocation of the "createEvent" function, by outputting a description saying "I am creating a new calendar event for 10 AM to 10:30 AM tomorrow." The computerized assistant may produce descriptive text and/or speech based on the computerized assistant program in any suitable fashion, for example by matching the program to a natural language template and recursively populating fields of the template with data from the program and/or data generated by recursively invoking natural language templates. With reference to FIG. 1, computerized assistant 122 may include a description machine 130 configured to generate a description for any computerized assistant program output. For example, description machine 130 may be configured to cause computerized assistant 122 to output one or more utterances 136, e.g., in the form of speech audio and/or human-readable text. In some examples, description machine 130 may be configured to save a generated description into a dialogue history (e.g., the description may be provided to dialogue history machine 134 to be saved into dialogue history 300).

Alternately or in addition to describing the program, the computerized assistant may be configured to perform computational actions by interacting with other computer devices, programs, and/or application-programming interfaces (e.g., the "createEvent" function may be configured to interact with a calendar application via an application-programming interface to save a new calendar event for the user). The computerized assistant program may thereby assist the user with various computational and/or real-world tasks (e.g., sending emails, placing phone calls, and/or making purchases). In some examples, the dialogue history further includes a reference to the initial computerized assistant program. For example, the dialogue history may track all of the computerized assistant programs that are generated and/or executed (e.g., so as to keep track of actions that were previously performed, and/or actions that were generated but not yet performed).

The computerized assistant may be configured to conduct a multi-turn interaction with a user, by responding to the first utterance and/or receiving and responding to subsequent utterances. In some examples, a user may speak a second utterance in order to modify and/or build upon the computerized assistant's response to the first utterance. Although the examples herein are described with regard to a first utterance and a second, subsequent utterance occurring later in a multi-turn conversation, the second utterance may occur at any suitable time. For example, the second utterance may be in a different conversation involving the same and/or different user(s). As another example, the second utterance may actually occur before the first utterance, e.g., when resolving the first utterance, the computerized assistant may be configured to take into regard a previously-received second utterance, so as to ensure that the first utterance is processed in accordance with such earlier second utterance.

It is noted that the same utterance may serve as both a "first" and a "second" utterance, in the same or different interactions between a user and a computerized assistant. For example, an utterance may specify two different constraints that conflict within the same utterance and the constraints may be resolved according to the methods of the present disclosure. As another example, an utterance may specify a constraint for updating a previous action, resulting in an updated action. Nevertheless, a subsequent utterance may specify a new constraint for updating the (already-updated) action. For example, if a user asks "What is on my schedule this afternoon?" a computerized assistant may respond by listing scheduling items occurring after 12 PM. If the user then asks, "What about after 10 AM?" the computerized assistant may update the previous action (e.g., updating the action of listing scheduling items in the afternoon) with regard to a new constraint (e.g., between 10 AM and 12 PM) from the user utterance. If the user then also asks, "What about after 9 AM?" the computerized assistant may update the previous action (e.g., update the action of listing scheduling items in the morning starting at 10 AM, so as to instead list actions between 9 AM and 10 AM instead). In other words, the computerized assistant may respond to a new constraint in a user utterance by updating any previous action, including updating an action that was already updated with regard to a constraint provided in a previous turn.

Irrespective of when the second utterance occurs, the second utterance may indicate a new constraint that may conflict with the initial constraint. For example, constraints may conflict when the constraints have different breadth (e.g., one constraint is broader or narrower than the other), incompatible details (e.g., the constraints specify mutually contrary facts), or other differences that would make revision of the initial computerized assistant program desirable.

Returning to FIG. 2, at 206, method 200 includes receiving a second utterance indicating a new constraint that conflicts with the initial constraint. As shown in FIG. 3A, in a second user utterance 306A, a user may ask to extend the meeting to 60 minutes (instead of the previously-indicated 30-minute duration). In some examples, method 200 optionally further includes adding the second utterance to the dialogue history. Based on collecting utterances within a dialogue history and/or responding to the utterances, the computerized assistant may conduct a multi-turn dialogue in which the computerized assistant responds to two or more user utterances over a period of time. With reference to FIG. 1, computerized assistant 122 may be configured to respond to user 124 over multiple turns, for example by operating code generation machine 128 to generate a new computerized assistant program in response to each incoming user utterance 126. In some examples, dialogue history machine 134 may be configured to store a second utterance indicating a new constraint that conflicts with the initial constraint in the dialogue history 300, as with second user utterance 306A of dialogue history 300A shown in FIG. 3A.

Returning to FIG. 2, at 208, method 200 further includes recognizing a revision function statement parametrized by a reference to the initial computerized assistant program and a reference to the new constraint. The revision function statement is a simple, human-readable statement that specifies the initial computerized assistant program and the new constraint (e.g., the new constraint with regard to which the program will be revised). The revision function statement is accordingly brief and may be relatively easy to read/author by a human annotator and/or relatively easy for generation by a code generation machine, as compared to reading/ authoring/generating different expanded code that is particular to each different type of revised program.

FIG. 3A shows a nonlimiting example of a revision function statement 308A. In the illustrated example, revision function statement 308A is written in an example programming language of the computerized assistant that uses the syntax "revise(Initial Program, Constraint1, . . . Constraint N) where "Initial Program" indicates a reference to an initial program to be revised. The revision function statement is further configured for parametrization with one or more constraints. The revision function statement specifies new constraints to be applied to the initial computerized assistant program, and the new constraints may be generically specified so that any computerized assistant program may be revised with regard to the new constraints, where "Constraint1" through "Constraint N" indicate any suitable number (e.g., up to N) different constraints. The illustrated syntax is not limiting, as any other suitable syntax may be used. For example, the revision function statement may include any suitable programming language syntax that allows indicating a reference to any computerized assistant program (irrespective of specific features of the particular computerized assistant programs) and/or a reference to a constraint (irrespective of specific features of the constraint).

The revision function statement is configured for parametrization with a plurality of different types of computerized assistant programs. For example, the same revision function statement, e.g., revise(Initial Program, Constraint1, . . . Constraint N), may be parameterized with different types of computerized assistant programs (e.g., by different choices of "Initial Program"), such as programs for scheduling meetings, purchasing airline tickets, ordering food, and/or to any other computerized assistant programs.

The revision function statement 308A includes the variable "x1" indicating a reference to an executable portion of initial computerized assistant program 304A. In revision function statement 308A, the variable "x1" specifically indicates the call to the "createEvent" function starting on the line after the variable assignment "[x1]= . . . ". Although FIG. 3A shows an explicit reference variable named "x1," the reference to the initial computerized assistant program may be any suitable reference, for example, a filename/line of code, function name, a reference to a specific previously-generated program in a computerized assistant dialogue history, and/or a search-history function configured to select a previously-generated program in the computerized dialogue history (e.g., based on a salient characteristic such as "meetings" or "scheduling"). As another example, a different variable referring to a different portion of the initial program and/or a different initial program may be used. In the example, revision function statement 308A is further parametrized by a new constraint indicating that the event duration for the meeting should be 60 minutes.

Returning to FIG. 2, at 210, method 200 further includes executing instructions derived from the revision function statement, to return a revised computerized assistant program that is configured to satisfy the new constraint. In other words, for a given computerized assistant program, the instructions are configured to return a corresponding revised computerized assistant program that is based on the new constraint.

In some examples, the revision model machine 132 may be configured to store and/or generate instructions executable by the computerized assistant. Revision model machine 132 is configured to process the revision function statement with regard to any initial computerized assistant program and/or any new constraint(s) specified as parameters in the revision function statement. Accordingly, the instructions from the revision model machine 132 are configured, when executed, to generate the revised computerized assistant program based on the revision function statement and the initial computerized assistant program.

In some examples, revision model machine 132 may utilize one or more revision models to generate the revised computerized assistant program. For example, a revision model may include executable code, parameters, and/or data configured to return the revised program. As a non-limiting example, the revision model may include a previously-trained machine learning model (e.g., with executable code to evaluate and/or train the model, parameters resulting from training of the model, and/or data useable as examples for training and/or evaluation). As another non-limiting example, the model may include a rule-based model (e.g., with executable code to evaluate one or more pre-defined rules, based on parameters/data defining such rules).

In some examples, the revision model is a previously-trained machine learning model trained based on human-annotated training data including the revision function statement as parameterized with an exemplary initial computerized assistant program and constraint(s) labeled with corresponding exemplary revised computerized assistant programs. For example, each training data example may include an exemplary revision function statement (e.g., revision function statement 308A of FIG. 3A as a non-limiting example) labeled with a corresponding exemplary revised computerized assistant program received from a human annotator (e.g., revised computerized assistant program 310A of FIG. 3A). In some examples, the revision model may be configured to return, for a given revision function statement, an exact corresponding revised computerized assistant program that was received along with that revision function statement from a human annotator. Additionally, the revision model may be configured to evaluate an arbitrary revision function statement, and to return a suitable revised computerized assistant program (e.g., even when neither of the revision function statement or the revised computerized assistant program were specifically included within the training data).

In some examples, the revision model includes a plurality of pre-defined rules configured to transform the initial computerized assistant program based on the new constraint. In some examples, a plurality of pre-defined rules may comprise a rule-based model. For example, the rule-based model may be a domain-specific rule-based model including a plurality of pre-defined rules for a specific domain (e.g., pre-defined rules for revising scheduling programs). In some examples, the revision model includes a combination of one or more pre-defined rule-based models and/or one or more previously-trained machine learning models. For example, revision model machine 132 may provide one or more domain-specific revision models, each configured to revise computerized assistant programs with regard to a specific domain (e.g., separate domain-specific models for each of meetings, airlines, and/or food). Accordingly, revision model machine 132 may be extended to new domains by adding new domain-specific revision models.

In some examples, revision model machine 132 is configured to determine a suitable revised computerized assistant program based on the revision function statement 308A and optionally further based on any suitable contextual information (e.g., based on user preferences, user schedule, and/or previous interactions with a user such as previous utterances by the user and/or previous computerized assistant programs and/or responses saved in a dialogue history 300). As an example, such contextual information may be provided to a revision model of revision model machine 132 (e.g., a machine-learning model previously trained on annotated examples that indicate contextual information, and/or a rule-based model with one or more rules for revising a program based on contextual information).

Revision model machine 132 is configured to process a given revision function statement based on the parameters of the statement, e.g., based on particular details of the initial computerized assistant program and/or based on particular details of the new constraint(s). For example, revision model machine 132 may be configured to identify and utilize, for a given type of initial program, a corresponding model and/or other logical constructs (e.g., executable code) configured to apply revisions to that type of initial program. For example, revision model machine 132 may be configured to determine which model(s) to use to process a revision function statement based on the initial computerized assistant program being a domain-specific program (e.g., processing a scheduling program with a scheduling domain-specific model). In some examples, revision model machine 132 may provide a domain-agnostic revision model configured to revise computerized assistant programs with regard to any domain (e.g., meetings, airlines, and/or food). For example, the domain-agnostic revision model may be configured to handle particular types of constraints (e.g., a domain-agnostic revision model for rescheduling that may be applied to any scheduling-related scenario, such as meetings, airline ticketing, and/or restaurant reservations). In some examples, the domain-agnostic revision model may be extended to handle new types of programs. In some examples, revision model machine 132 may provide a domain-specific revision model configured to revise computerized assistant programs with regard to a particular domain (e.g., meetings). Revision model machine 132 may include any suitable set of domain-specific and/or domain-agnostic models. Accordingly, revision model machine 132 may automatically determine which domain-specific and/or domain-agnostic model(s) to use to process a particular revision function statement (e.g., based on a domain associated with the program and/or constraints).

Revision model machine 132 may be extended to handle diverse computerized assistant programs. Revision model machine 132 may be configured to provide revisions with regard to any suitable initial type of computerized assistant program (e.g., programs for scheduling meetings, purchasing airline tickets, and/or ordering food), and/or extended to provide revisions with regard to new types of computerized assistant programs. As an example, when the revision model machine is configured to utilize a machine learning model, the machine learning model may be extended by retraining with training data including the new types of programs. As another example, when revision model machine 132 uses a rule-based model, the rule-based model may be extended by adding additional rules.

Even when revision model machine 132 is extended to handle new programs, the format of the revision function statement remains unchanged. The unchanging format of the revision function statement may simplify the process of collecting annotated training data from human annotators, thereby reducing an expense of training a machine learning system. For example, human annotators may be more readily able to create high-quality annotations due to consistency of the revision function statement format. Furthermore, the revision function statement may remain simple (e.g., specifying a program and constraints without further details) while still being useable to revise new programs as the revision model machine 132 is extended. Furthermore, the simplicity and unchanging nature of the revision function statement may reduce an amount of training data that is required to train a sufficiently performant machine learning system (e.g., training revision model machine 132 to generate revisions and/or training code generation machine 128 to generate revision function statements). Therefore, the unchanging and simple revision function statement may not only further reduce cost of collecting annotations, but also may reduce computational cost, memory storage cost, and latency associated with training a machine learning system. Furthermore, the relative simplicity of the revision function statement may reduce computational costs associated with operating a trained machine learning system (e.g., reducing a latency and/or power cost of operating revision model machine 132 and/or code generation machine 128).

In other words, revision function statements may always adhere to a simple format, and revision model machine 132 may be programmed to handle new types of computerized assistant programs, thus shielding the underlying complexity from human annotators. Human annotators and/or machine-learning trained components such as code generation machine 128 may thereby learn how to work with revision function statements more easily, and the revision function statements may be processed by revision model machine 132 to produce effectively revised programs.

Returning to FIG. 2, at 210, method 200 further includes executing instructions derived from the revision function statement, to return a revised computerized assistant program that is configured to satisfy the new constraint. In other words, the revised computerized assistant program is generated based on the revision function statement and configured to satisfy the new constraint. The revision function statement may be parametrized with a plurality of different computerized assistant programs, and configured to return, for a given computerized assistant program, a corresponding revised computerized assistant program based on the new constraint.

For example, as shown in FIG. 3A, revised computerized assistant program 310A is similar to initial computerized assistant program 304A, but is modified to indicate a meeting with a start time of 10:00 AM and a duration of 60 minutes (e.g., the new meeting will end at 11 AM instead of 10:30 AM). Revised computerized assistant program 310A is one non-limiting example of a revised program configured to satisfy the new constraint based on the revision function statement 308A. For example, revision function statement 308A indicates that the meeting needs to be an hour, but does not specify that the meeting needs to start at 10 AM. In another non-limiting example, revision model machine 132 is configured to output a revised computerized assistant program that will schedule a meeting from 9:30 AM to 10:30 AM. For example, if the user's schedule has another appointment at 10:30 AM, then the hour-long meeting may be completed before the other appointment by starting at 9:30 AM instead of 10 AM. In other words, there may be more than one suitable revised computerized assistant program based on the revision function statement. Accordingly, revision function statement 308A may be processed by revision model machine 132 to generate a revised computerized assistant program 310A. For example, revision model machine 132 may be configured to determine a suitable revised computerized assistant program using one or more revision models. Revision model machine 132 may be configured to evaluate the revision model(s) with regard to the initial computerized assistant program, the new constraint(s), and/or based on any suitable contextual information (e.g., based on user preferences, user schedule, and/or previous interactions with a user). The revision model is configured to derive, from the revision function statement, suitable instructions configured to generate the revised computerized assistant program based on the revision function statement and the initial computerized assistant program.

For example, with reference to FIG. 3A, revision function statement 308A may be translated into revised computerized assistant program 310A by revision model machine 132 (as shown in FIG. 1), using any suitable revision model(s). In examples, revision model machine 132 may be configured to determine the revised computerized assistant program using any suitable programmatic techniques. In some examples, the revision model includes a plurality of pre-defined rules configured to transform a computerized assistant program based on the new constraint. Alternately or additionally, in some examples, the revision model is a previously-trained machine learning model trained based on an exemplary revision function statement and an exemplary revised computerized assistant program received from a human annotator. Accordingly, the revision model may incorporate any suitable combination of a previously-trained machine learning model configured to generate computerized assistant programs, one or more pre-defined rules for revising computerized assistant programs, and/or a mixture of machine learning model(s) and pre-defined rules.

Returning to FIG. 2, the revised computerized assistant program may be used in any suitable way, for example, to continue the multi-turn dialogue by responding to the user's second utterance indicating the new constraint. As one non-limiting example, at 212, method 200 optionally further includes saving a reference to the revised computerized assistant program in the dialogue history. Accordingly, the revised computerized assistant program may be executed at any suitable time. As another non-limiting example, at 214, method 200 optionally further includes executing the revised computerized assistant program (e.g., to cause the computerized assistant to perform actions to assist the user). When the revised computerized assistant program 310A is executed, the computerized assistant may be configured to emit a suitable description, for example indicating that the previous action is being revised according to the new constraint and/or indicating any new action(s) being performed. For example, although not shown in FIG. 3A, the computerized assistant may be configured to emit a text and/or speech description saying, "OK, I re-scheduled your meeting for 10 AM to 11 AM."

In some examples, executing the revised computerized assistant program includes un-doing one or more operations performed by the initial computerized assistant program. For example, the computerized assistant may be configured to un-do the initial computerized assistant program before beginning execution of the revised computerized assistant program. As another example, the computerized assistant may be configured to recognize when a new operation in the new computerized assistant program may conflict with a previous operation that was performed in the initial computerized assistant program, in order to un-do such previous operation before performing the new operation. In some examples, each operation of the initial computerized assistant program may be configured to allow an "un-do" of the operation. In some examples, "un-do" of an operation may require particular steps to be taken to account for the effects of having done the operation in the first place. For example, if an operation results in scheduling a new calendar event, un-doing the operation may including deleting the calendar event. As another example, if the operation includes making an appointment/reservation with another entity (e.g., a restaurant reservation or a meeting invitation), un-doing the operation may include suitable steps to cancel the original appointment/reservation (e.g., sending a cancellation message). In general, the computerized assistant may be configured to suitably prompt the user before performing and/or un-doing any operation with real-world effects, e.g., prompting the user before making or cancelling an appointment.

Revision model machine 132 is generally configured to resolve the new constraint and the initial constraint, so as to find a solution that satisfies the new constraint while also satisfying relevant aspects of the initial constraint. In some examples, revision model machine 132 is configured to convert the new constraint, along with the initial constraints of the initial computerized assistant program, into a constraint satisfaction problem (CSP), in order to derive the new computerized assistant program based on a solution to the CSP. In some examples, the CSP may include further constraints (e.g., domain-agnostic and/or domain-specific constraints) independently of the new constraint and/or user utterance. For example, the CSP may include a domain-agnostic constraint indicating that "events must start before they end," or "a domain-specific constraint indicating that "air travel itineraries with fewer than 20 minutes between connecting flights are not viable."

For example, revision model machine 132 may be configured to assess a cost function for CSP solutions, in order to find a minimal-cost solution of the CSP. As a non-limiting example, the CSP may be encoded as a constraint graph, including a plurality of nodes indicating constraint variables, and a plurality of edges indicating implication relationships among the constraint variables. For example, the graphical structure as indicated by the edges connecting nodes may be used to propagate relationships between constraints based on the associativity and/or transitivity of logical implication. As an example, solving the CSP may include finding a set of constraints (e.g., a sub-graph of the constraint graph) that includes the new constraint such that the constraints in the set of constraints are mutually satisfiable. In some examples, the individual nodes and/or edges of the constraint graph may be referred to as sub-constraints, e.g., a sub-graph may indicate a sub-constraint of the initial constraint or a sub-constraint of the new constraint.

In some examples, solving the constraint satisfaction problem may include finding a plurality of candidate constraint solutions to the constraint satisfaction problem, and selecting a candidate constraint solution based on a cost function. For example, the cost function may be based on a previously-trained machine learning model and/or based on a plurality of pre-defined rules. For example, each rule may indicate how to evaluate the cost of a sub-constraint and/or indicate a mathematical function for aggregating costs for multiple sub-constraints. In some examples, each of the candidate constraint solutions to the constraint satisfaction problem is generated by one of the models of a revision model machine (e.g., revision model machine 132 of FIG. 1). For example, revision model machine 132 may be configured to operate a plurality of domain-agnostic and/or domain-specific models (e.g., rule-based models and/or machine-learning models) to cause each model to return one candidate constraint solution, so that the plurality of models generate the plurality of candidate constraint solutions to the constraint satisfaction problem.

In some examples, a solution to the CSP is a relaxation of the constraints of the initial computerized assistant program (e.g., a minimal-cost relaxation). Accordingly, solving the CSP may include finding the logical relaxation of the initial constraint. For example, the new constraint may conflict with the initial constraint (e.g., in the sense that the CSP including the new constraint and the initial constraint produces no solutions). Alternately or additionally, the new constraint may have a different scope from the initial constraint (e.g., because the new constraint is broader than the initial constraint, and/or because the new constraint is incompatible with a particular sub-constraint of the initial constraint). To deal with such differences in constraint scope, the initial constraint problem may be relaxed until the new constraint(s) are either non-trivial (e.g., the new constraints feasibly narrow the solution space of the CSP), and/or until the new constraints no longer conflict.

For example, a relaxation of the constraints may include finding a set of relaxed constraints that are less constraining as compared to the initial constraints. The set of relaxed constraints may have an estimated cost according to any suitable cost function (e.g., a machine learning function and/or hard-coded cost rules). In some examples, the relaxed constraints are configured to satisfy one or more solution conditions related to the constraints. For example, a solution condition may be that the user constraint is not implied by the relaxed constraints (e.g., thereby ensuring that the new user constraint introduces new information that will result in a suitably updated computerized assistant program). As another example, a solution condition may be that the conjunction of the new user constraint and the relaxed constraints is satisfiable (e.g., thereby ensuring that the updated computerized assistant program will satisfy the new user constraint, while also satisfying as many of the initial constraints as possible). Revision model machine 132 may be further configured to translate the relaxed set of constraints into a new program. For example, revision model machine 132 may be configured, for each constraint in the relaxed set of constraints, to generate a corresponding computerized assistant program instruction that ensures that particular constraint is met when the new computerized assistant program is executed.

In some examples, the logical relaxation of the initial constraint is determined based on recognizing a conflict between the second utterance and the initial constraint. As an example, with reference to FIG. 3A, the revision model may be configured to extract constraints from the initial program, such as "start=10 AM" and "end=10:30 AM." The revision function statement 308A specifies: "RevisionModel([OldProgram], Constraint{duration: ?=(60.toMinutes( ))})," e.g., indicating a new constraint of "duration=60 minutes." Accordingly, the revision model may be further configured to find a relaxation of the initial constraints in conjunction with the new constraint ("duration=60 minutes"), for example, by dropping an existing constraint "end=10:30 AM," based on the conflict that arises between a 60 minute meeting (as specified by the second user utterance) and the initial constraint (meeting starting at 10 AM and ending at 10:30 AM, which is only a 30 minute duration). This relaxation ensures that the "duration" is no longer derived from the "start" and "end" constraints (e.g., as the duration is now explicitly specified by the user in the new constraint). Furthermore, the relaxation ensures that the new conjunction of constraints ("start=10 AM" and "duration=60 minutes") is satisfiable. Accordingly, the revision model is configured to generate a revised computerized assistant program 310A executable to create a new calendar event according to the new constraints.

The result described above and shown in FIG. 3A is one non-limiting example of a suitable result that may be obtained by a revision model for revision function statement 308A. Based on different training and/or hard-coded rules, alternative revised computerized assistant programs may be obtained with different functionality. For example, the revised computerized assistant program 310A may be derived based on a rule and/or cost function indicating that a user generally prefers to keep the initial meeting start time. However, using a different rule indicating that a user generally prefers to keep the meeting end time (e.g., based on having a subsequent event scheduled after the meeting), instead of a revised program for scheduling a meeting with a start of 10 AM and a 60 minute duration, a revision model may be configured to produce an alternative revised program for scheduling a meeting with a start of 9:30 AM and a 60 minute duration (e.g., so as to keep the original meeting end time, while allowing the meeting start time to be revised). In some examples, a computerized assistant may be configured to operate the revision model to generate a plurality of alternative solutions, so as to choose one of the alternative solutions based on user selection (e.g., by prompting the user to choose a 9:30 AM start time or a 10 AM start time) and/or based on a separate scoring function (e.g., based on a scoring function that checks the user's calendar to assess conflicts that may already be scheduled between 9:30 AM and 10 AM that would conflict with a 9:30 AM-10:30 AM meeting and conflicts that may already be scheduled between 10:30 AM and 11 AM that would conflict with a 10 AM-11 AM meeting).

Constraints may be assessed for a relaxation cost according to any suitable cost function (e.g., a machine-learning function and/or hard-coded rules). Accordingly, the revision model may be configured to revise arbitrarily complex computerized assistant programs, based on suitable constraint semantics and/or relaxation costs. As an example, a relaxation cost may include a rule-based function, e.g., "relaxing end time is cheaper than relaxing start time," so that the model would relax "end" preferentially as compared to relaxing "start." Alternately or additionally, the cost may be based on a machine learning model trained to recognize costs for relaxing different constraints in different contexts. For example, the machine learning model may be trained using supervised training on labeled data tuples. For example, a tuple may indicate an initial computerized assistant program, a new constraint from a user, and a suitable revised computerized assistant program that is configured to satisfy the new constraint. Accordingly, in some examples, the revision model is a previously-trained revision model, and the methods of the present disclosure include retraining the previously-trained revision model based on a labeled data tuple including an exemplary revision function statement and an exemplary revised computerized assistant program received from a human annotator.

FIG. 3A illustrates an example in which an initial constraint is broadened/dropped to resolve a new constraint (e.g., the meeting end time was relaxed to allow for a longer meeting). In addition to the meeting scheduling example shown in FIG. 3A, the methods of the present disclosure are suitable for handling revised constraints from any other interaction(s) between a user and a computerized assistant.

FIGS. 3B-3F show a variety of other scenarios in which revision model machine 132 uses one or more revision model (e.g., machine learning and/or rules based) to update initial computerized assistant program based on new constraints. As non-limiting examples, a revision model may be configured to allow adding a new constraint, narrowing/specifying an existing constraint from the initial set of constraints, broadening an existing constraint, deleting an existing constraint, and/or changing an existing constraint to a different constraint. By altering, adding, and/or deleting constraints, the revision model may determine a revised computerized assistant program that suitably incorporates any new constraint(s) specified by the user. All of the non-limiting examples of FIGS. 3B-3F use the same revision function statement syntax, thus demonstrating how a revision model machine may be configured to revise any given program using the same revision function statement syntax. As discussed above, this allows human annotators to provide annotations according to the simple, unchanging revision function statement syntax to train a code generator to generate suitable revision function statements for any of the non-limiting examples and/or in any other suitable scenario. Furthermore, the trained code generator may be better able to generate suitable revision function statements based on the simple/unchanging syntax. Furthermore, the revision function statements only need to specify new constraints according to which to revise programs, and the new constraints are automatically resolved along with any previously-defined constraints (e.g., from an earlier user utterance, and/or from an initial computerized assistant program for responding to that user utterance). Because the revision function statement only requires new constraints to be listed, human annotators may more easily learn to author and/or approve appropriate training data.

FIG. 3B shows another example of a dialogue history 300B in which resolving a new constraint from the second user utterance 306B results in tightening the initial constraint. The initial constraint inferred from first user utterance 302B is all events during the next day. Based on output generated by the computerized assistant (e.g., speech audio and/or human-readable utterances, not shown in FIG. 3B), the user may indicate in second user utterance 306B that a narrower time window should be used for the list of events. Accordingly, the revision function statement 308B may include a narrower constraint indicating a window of time in the afternoon. For example, the code generator may be configured to generate the shown constraints for a time between 12 PM and 5 PM for a particular user based on user preferences, schedule, etc. As another example, "afternoon" may be defined, in a hard-coded rule, as being times between 12 PM and 5 PM (or any other suitable times). Alternately or additionally, a code generation machine may be configured to output constraints relating to any suitable afternoon time in a context-dependent fashion, e.g., outputting events between 12 PM and 5 PM for a user who ends their work-day at 5 PM, or outputting events between 12 PM and 6 PM for a user who ends their work-day at 6 PM. Although the example shows a constraint explicitly specifying the "afternoon" start and end time, alternately or additionally a constraint may be specified in terms of a function statement that may be evaluated to determine a suitable afternoon time. For example, instead of generating a constraint "Constraint[Event]{start: >(DateTime{date: [x0], time: Time(12:00)}) }, end: <=(DateTime{date: [x0], time: Time(17:00)})" the code generator may be configured to instead generate a constraint such as "Constraint[Event] {getSalient('afternoon')}" where "getSalient('afternoon')" is a function statement indicating that a suitable afternoon time range should be evaluated based on any suitable machine learning function(s), hard-coded rule(s), user preference(s) and/or configuration setting(s), dialogue history, etc.

Based on the new constraints indicating a time window in the afternoon, the initial "DateTime" constraints from the initial computerized assistant program 304B are tightened by the revision model to obtain the new start and end constraints in revised computerized assistant program 310B.

FIG. 3C shows another example of a dialogue history 300C in which an initial constraint from first user utterance 302C is broadened based on resolving the new constraint from second user utterance 306C. For example, the initial constraint derived from first user utterance 302C and reflected in initial computerized assistant program 304C may be logically relaxed, with a logical relaxation of the initial constraint being based on recognizing that the second utterance logically implies a sub-constraint of the initial constraint. As shown, the initial constraint indicates events after 12 PM. If the user does not hear what they expected, they may wish to hear events starting at an earlier time. Accordingly, the user indicates in second user utterance 306C that they wish to hear events after 10 AM. However, "after 10 AM" logically implies the sub-constraint "after 12 PM." As such, a logical conjunction of "after 10 AM" and "after 12 PM" is just "after 12 PM," because all of the times that are after 10 AM and also after 12 PM are after 12 PM. Thus, resolving the new constraint and the initial constraint may include relaxing the initial constraint, thereby broadening it so that the new constraint introduces new information and causes a different result as compared to the initial constraint. For example, given a new constraint of a time starting after 10 AM in revision function statement 308C, the revision model is configured to generate a revised computerized assistant program 310C configured to find all events after 10:00 AM, disregarding the original constraint of "after 12 PM." Although not shown in FIG. 3C, based on suitable rules and/or training, the revision model may alternately or additionally generate a revised computerized assistant program configured to find all events before 10 AM and before 12 PM (e.g., because the user did not find the event they were interested in among events after 12 PM, so the event of interest may be between 10 AM and 12 PM).

FIG. 3D shows another example of a dialogue history 300D, in which resolving the new constraint results in a revision of the initial constraint. As shown, in the first user utterance 302D, the user creates a meeting and invites "David A," which is handled by initial computerized assistant program 304C. However, the user later indicates in second user utterance 306D that actually "David B," should be invited, not "David A." Accordingly, the revision function statement 308D indicates that "David B," should be invited instead of "David A," and the revised computerized assistant program 310D accordingly indicates that "David B" and "Adam C" should be invited, while "David A" should not be invited.

FIG. 3E shows another example in which a user interacts with the computerized assistant to search for an airline flight, as shown in dialogue history 300E. Based on the initial constraint indicated in first user utterance 302E, the initial computerized assistant program 304E is configured to search for a suitable flight. However, as the assistant utterance 305E indicates (e.g., via speech audio and/or human-readable text), the computerized assistant is unable to find any matching flight. Accordingly, the user asks for an earlier flight the previous day, Tuesday, as indicated in second user utterance 306E. The revision function statement 308E indicates the new constraint for finding a flight on Tuesday. The resulting revised computerized assistant program 310E is configured to search for a flight on Tuesday, dropping the original "Wednesday" constraint. As compared to initial computerized assistant program 304E, revised computerized assistant program 310E does not constrain the time to be before 5 PM. For example, since the flight is arriving the previous day, it may no longer be necessary to arrive before 5 PM (on Tuesday) to ensure the user is able to complete a desired itinerary in Seattle (starting at 5 PM on Wednesday). This result obtained by the revision model may reflect a context-specific prediction the revision model was trained to achieve based on annotation data.

Figure 3F:
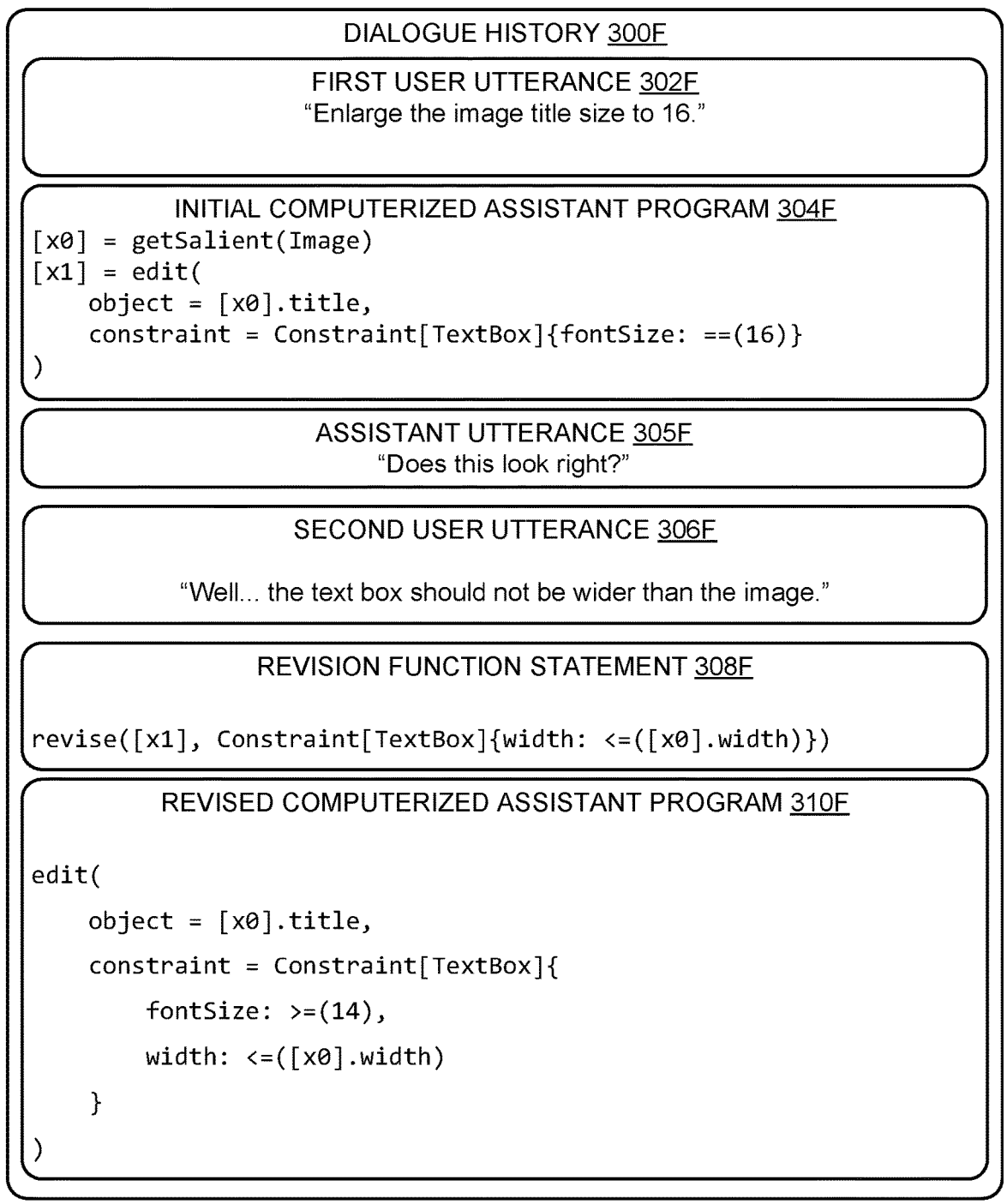

FIG. 3F shows another example of a dialogue history 300F showing a user interaction with a computerized assistant to control a graphical editor (e.g., within a presentation program). In first user utterance 302E, the user asks to enlarge an image title size to a font size of 16. The computerized assistant is configured to execute the initial computerized assistant program 304F and confirm in assistant utterance 305F whether the user is satisfied with the resulting change. As shown, the initial computerized assistant program 304F uses a "getSalient" search-history function to search for a salient image based on a context of interaction between the user and the computerized assistant, e.g., an image the user is currently working on. After finding the salient image, the initial computerized assistant program 304F changes the font size of a related text box. However, as indicated in second user utterance 306F, the user does not want the text box to be wider than the image. Accordingly, revision function statement 308F indicates that the text box width should be less than the image width. However, this decreased width of the text box may require a decreased font size. Accordingly, revised computerized assistant program 310F uses a font size of at least 14, which is a smaller minimum font size (e.g., a broader and/or relaxed constraint) as compared to the initial constraint in which the font size is at least 16. As an example, the font size of 14 may be the minimal relaxation of the initial constraint (e.g., increasing the font size pursuant the user's intent in first user utterance 302F, to as close to size 16 as possible), that allows the new constraint to be resolved (e.g., decreasing the font size somewhat from the initial request of 16, to allow for the text box being at most as wide as the image). As an example, the font size of 14 may represent a solution having a lowest cost/highest score among a plurality of candidate solutions (e.g., candidate solutions for different font sizes).

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 4:
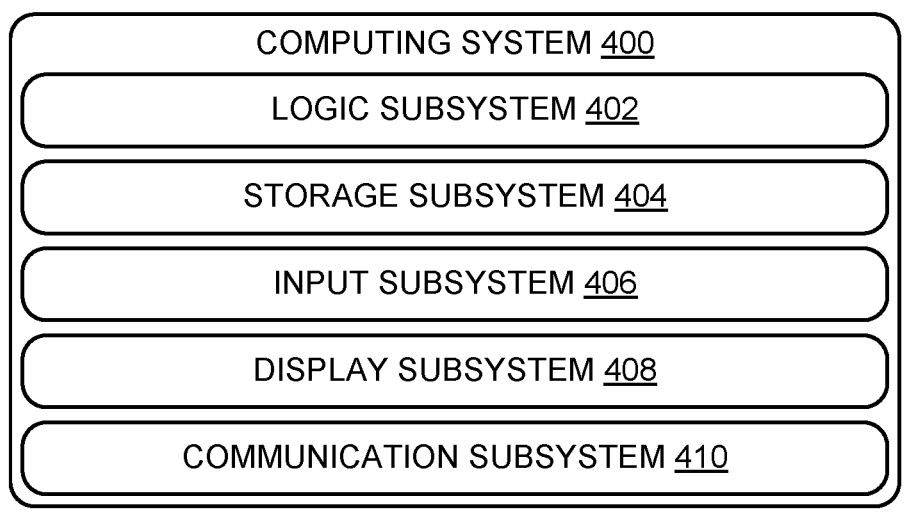
FIG. 4 shows an exemplary computing system.

FIG. 4 schematically shows a simplified representation of a computing system 400 configured to provide any to all of the compute functionality described herein. Computing system 400 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 400 may be configured to implement method 200. As another example, computing system 400 may be a computerized assistant 122.

Computing system 400 includes a logic subsystem 402 and a storage subsystem 404. Computing system 400 may optionally include a display subsystem 408, input subsystem 406, communication subsystem 410, and/or other subsystems not shown in FIG. 4.

Logic subsystem 402 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 404 includes one or more physical devices configured to temporarily and/or permanently hold computer information such as data and instructions executable by the logic subsystem. When the storage subsystem includes two or more devices, the devices may be collocated and/or remotely located. Storage subsystem 404 may include volatile, nonvolatile, dynamic, static, read/write, read-only, random-access, sequential-access, location-addressable, file-addressable, and/or content-addressable devices. Storage subsystem 404 may include removable and/or built-in devices. When the logic subsystem executes instructions, the state of storage subsystem 404 may be transformed—e.g., to hold different data.

Aspects of logic subsystem 402 and storage subsystem 404 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

When included, display subsystem 408 may be used to present a visual representation of data held by storage subsystem 404. This visual representation may take the form of a graphical user interface (GUI). Display subsystem 408 may include one or more display devices utilizing virtually any type of technology. In some implementations, display subsystem may include one or more virtual-, augmented-, or mixed reality displays.

When included, input subsystem 406 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 410 may be configured to communicatively couple computing system 400 with one or more other computing devices. Communication subsystem 410 may include wired and/or wireless communication devices compatible with one or more different communication protocols. The communication subsystem may be configured for communication via personal-, local- and/or wide-area networks.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices. As examples, with reference to FIG. 1, computerized assistant 122 may be implemented as one or more machines, e.g., including code generation machine 128, description machine 130, revision model machine 132, and/or dialogue history machine 134.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, machines and/or models may be adjusted via training, thereby configuring the machines/models to perform a desired function. For example, the computerized assistant 122 of FIG. 1, including code generation machine 128, description machine 130, revision model machine 132, and/or dialogue history machine 134 may be trained based on annotated data indicating exemplary user utterances, computerized assistant programs, revision function statements, and/or based on any other suitable training data. As an example, the instructions stored in storage subsystem 404 may be executable to operate and/or train code generation machine 128, description machine 130, revision model machine 132, and/or dialogue history machine 134 based on the annotated data. For example, the instructions may be executable to operate a previously-trained revision model to derive the revised computerized assistant program, and to retrain the previously-trained revision model based on an exemplary revision function statement and an exemplary revised computerized assistant program received from a human annotator.

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

In some examples, a computerized assistant may incorporate one or more language models, for example, for processing user utterances. Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future ML and/or AI models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., an HMM or a CRF. The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method of adapting a computerized assistant program to satisfy an updated constraint comprises: maintaining a dialogue history including a first utterance that indicates an initial constraint; receiving a second utterance indicating a new constraint that conflicts with the initial constraint; recognizing an initial computerized assistant program configured to satisfy the initial constraint; recognizing a revision function statement parametrized by a reference to the initial computerized assistant program and a reference to the new constraint; and executing instructions derived from the revision function statement to return a revised computerized assistant program that is configured to satisfy the new constraint. In this or any other example, the revision function statement is configured for parametrization with a plurality of different computerized assistant programs, and wherein instructions derived from the revision function statement are configured to return, for a given computerized assistant program, a corresponding revised computerized assistant program based on the new constraint. In this or any other example, the method further comprises operating a revision model to derive the instructions from the revision function statement, wherein the instructions are configured to generate the revised computerized assistant program based on the revision function statement and the initial computerized assistant program. In this or any other example, the revision model is a previously-trained machine learning model trained based on an exemplary revision function statement and an exemplary revised computerized assistant program received from a human annotator. In this or any other example, the revision model includes a plurality of pre-defined rules configured to transform the initial computerized assistant program based on the new constraint. In this or any other example, the method further comprises converting the new constraint and the initial computerized assistant program into a constraint satisfaction problem. In this or any other example, the constraint satisfaction problem is encoded as a constraint graph including nodes indicating constraint variables and edges indicating implication relationships among the constraint variables. In this or any other example, the constraint satisfaction problem includes a logical relaxation of the initial constraint. In this or any other example, the logical relaxation of the initial constraint is based on recognizing a conflict between the second utterance and the initial constraint. In this or any other example, the logical relaxation of the initial constraint is based on recognizing that the second utterance logically implies a sub-constraint of the initial constraint. In this or any other example, the method further comprises finding a plurality of candidate constraint solutions to the constraint satisfaction problem, and selecting a candidate constraint solution based on a cost function. In this or any other example, the cost function is a previously-trained machine learning function. In this or any other example, the method further comprises un-doing one or more operations performed by the initial computerized assistant program. In this or any other example, the dialogue history further includes a reference to the initial computerized assistant program. In this or any other example, the method further comprises adding the second utterance to the dialogue history. In this or any other example, the method further comprises executing the revised computerized assistant program. In this or any other example, the method further comprising saving a reference to the revised computerized assistant program in the dialogue history.

In an example, a computer system comprises a logic subsystem; and a storage subsystem holding instructions executable by the logic subsystem to carry out the method of any of the examples described herein. In this or any other example, a computer program is configured, when executed on the computer system, to carry out the method of any of the examples described herein.

In an example, a computerized assistant system comprises: a dialogue history machine configured to maintain a dialogue history including a first utterance that indicates an initial constraint and a second utterance indicating a new constraint that conflicts with the initial constraint; a code generation machine configured to generate an initial computerized assistant program configured to satisfy the initial constraint, and to generate a revision function statement parametrized by a reference to the initial computerized assistant program and a reference to the new constraint; and a revision model machine configured to execute instructions derived from the revision function statement to return a revised computerized assistant program that is configured to satisfy the new constraint.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of adapting a computerized assistant program to satisfy an updated constraint, the method comprising:
   via a dialogue history machine of a computerized assistant system, maintaining a dialogue history including a first utterance that indicates an initial constraint;
   via the dialogue history machine, receiving a second utterance indicating a new constraint that conflicts with the initial constraint;
   via a code generation machine of the computerized assistant system, recognizing an initial computerized assistant program configured to satisfy the initial constraint;
   via a revision model machine of the computerized assistant system, recognizing a revision function statement parametrized by a reference to the initial computerized assistant program and a reference to the new constraint; and
   via the revision model machine, executing instructions derived from the revision function statement to return a revised computerized assistant program that is configured to satisfy the new constraint, wherein the revision model machine is configured to process the revision function statement using a previously-trained machine learning model and generate the revised computerized assistant program, thereby adapting the initial computerized assistant program to satisfy the new constraint.

2. The method of claim 1, wherein the revision function statement is configured for parametrization with a plurality of different computerized assistant programs, and wherein instructions derived from the revision function statement are configured to return, for a given computerized assistant program, a corresponding revised computerized assistant program based on the new constraint.

3. The method of claim 1, wherein the previously-trained model is used to derive the instructions from the revision function statement, wherein the instructions are configured to generate the revised computerized assistant program based on the revision function statement and the initial computerized assistant program.

4. The method of claim 3, wherein the previously-trained machine learning model is trained based on an exemplary revision function statement and an exemplary revised computerized assistant program received from a human annotator.

5. The method of claim 3, wherein the revision model machine applies a plurality of pre-defined rules configured to transform the initial computerized assistant program based on the new constraint.

6. The method of claim 5, further comprising converting the new constraint and the initial computerized assistant program into a constraint satisfaction problem.

7. The method of claim 6, wherein the constraint satisfaction problem is encoded as a constraint graph including nodes indicating constraint variables and edges indicating implication relationships among the constraint variables.

8. The method of claim 6, wherein the constraint satisfaction problem includes a logical relaxation of the initial constraint.

9. The method of claim 8, wherein the logical relaxation of the initial constraint is based on recognizing a conflict between the second utterance and the initial constraint.

10. The method of claim 8, wherein the logical relaxation of the initial constraint is based on recognizing that the second utterance logically implies a sub-constraint of the initial constraint.

11. The method of claim 6, further comprising finding a plurality of candidate constraint solutions to the constraint satisfaction problem, and selecting a candidate constraint solution based on a cost function.

12. The method of claim 11, wherein the cost function is implemented by a machine learning function.

13. The method of claim 1, further comprising un-doing one or more operations performed by the initial computerized assistant program.

14. The method of claim 1, wherein the dialogue history further includes a reference to the initial computerized assistant program.

15. The method of claim 1, further comprising adding the second utterance to the dialogue history.

16. The method of claim 1, further comprising executing the revised computerized assistant program.

17. The method of claim 1, further comprising saving a reference to the revised computerized assistant program in the dialogue history.

18. A computer system, comprising:
   a logic subsystem; and
   a storage subsystem holding instructions executable by the logic subsystem to:
   via a dialogue history machine of the computer system, maintain a dialogue history including a first utterance that indicates an initial constraint;
   via the dialogue history machine, receive a second utterance indicating a new constraint that conflicts with the initial constraint;
   via a code generation machine of the computer system, recognize an initial computerized assistant program configured to satisfy the initial constraint;
   via a revision model machine of the computer system, recognize a revision function statement parametrized by a reference to the initial computerized assistant program and a reference to the new constraint; and
   via the revision model machine, execute instructions derived from the revision function statement to return a revised computerized assistant program that is configured to satisfy the new constraint, wherein the revision model machine is configured to process the revision function statement using a previously-trained machine learning model and generate the revised computerized assistant program, thereby adapting the initial computerized assistant program to satisfy the new constraint.

19. The computer system of claim 18, wherein the revision function statement is configured for parametrization with a plurality of different computerized assistant programs, and wherein instructions derived from the revision function statement are configured to return, for a given computerized assistant program, a corresponding revised computerized assistant program based on the new constraint.

20. A computerized assistant system, comprising:
- a dialogue history machine configured to maintain a dialogue history including a first utterance that indicates an initial constraint and a second utterance indicating a new constraint that conflicts with the initial constraint;
- a code generation machine configured to generate an initial computerized assistant program configured to satisfy the initial constraint, and to generate a revision function statement parametrized by a reference to the initial computerized assistant program and a reference to the new constraint; and
- a revision model machine configured to execute instructions derived from the revision function statement to return a revised computerized assistant program that is configured to satisfy the new constraint, wherein the revision model machine is configured to process the revision function statement using a previously-trained machine learning model and generate the revised computerized assistant program, thereby adapting the initial computerized assistant program to satisfy the new constraint.

* * * * *